(No Model.) 2 Sheets—Sheet 1.

G. MORTSON.
BICYCLE SUPPORT.

No. 418,923. Patented Jan. 7, 1890.

WITNESSES
C. M. Newman
Axley I. Munson.

INVENTOR
George Mortson
By F. M. Wooster Atty.

N. PETERS, Photo-Lithographer, Washington, D. C.

(No Model.) 2 Sheets—Sheet 2.

G. MORTSON.
BICYCLE SUPPORT.

No. 418,923. Patented Jan. 7, 1890.

WITNESSES
C. M. Newman,
Arley I. Munson.

INVENTOR
George Mortson
By H. M. Wooster
Atty.

UNITED STATES PATENT OFFICE.

GEORGE MORTSON, OF BRIDGEPORT, CONNECTICUT.

BICYCLE-SUPPORT.

SPECIFICATION forming part of Letters Patent No. 418,923, dated January 7, 1890.

Application filed November 4, 1889. Serial No. 329,196. (No model.)

*To all whom it may concern:*

Be it known that I, GEORGE MORTSON, a subject of the Queen of Great Britain, residing at Bridgeport, in the county of Fairfield and State of Connecticut, have invented certain new and useful Improvements in Bicycle-Supports; and I do hereby declare the following to be a full, clear, and exact description of the invention, such as will enable others skilled in the art to which it appertains to make and use the same.

My invention has for its object to provide a support for bicycles which may be readily attached to any machine and will retain it in an upright position when not in use. It is of course well understood that in everything relating to bicycles there are several essential requirements, the lack of any of which will prevent the machine or attachment from going into general use. To begin with, strength, lightness, durability, compactness, and ease of operation are absolutely essential. In the case of attachments, those which remain upon the machine are required to be easy of attachment, to be entirely out of the way, and concealed as much as possible when not in use.

The one important requirement at the present time to adapt the safety-bicycle to general and business uses is an easily-operated support which may be readily attached to any machine to hold the machine upright when the rider leaves it temporarily, and which may be retracted out of the way and preferably out of sight when the machine is in use, thereby avoiding all danger of marring the machine by leaning it against stone-work, all danger of marring wood-work by leaning the machine against it, the breaking of windows in stores and places of business by the handles, and all danger to the machine by leaving it in the street with a pedal engaging the curbing.

With these requirements in view, and in order to produce a simple and inexpensive bicycle-support adapted to meet the general want, I have devised the novel construction of which the following description, in connection with the accompanying drawings, is a specification, numbers being used to denote the several parts.

Figure 1:
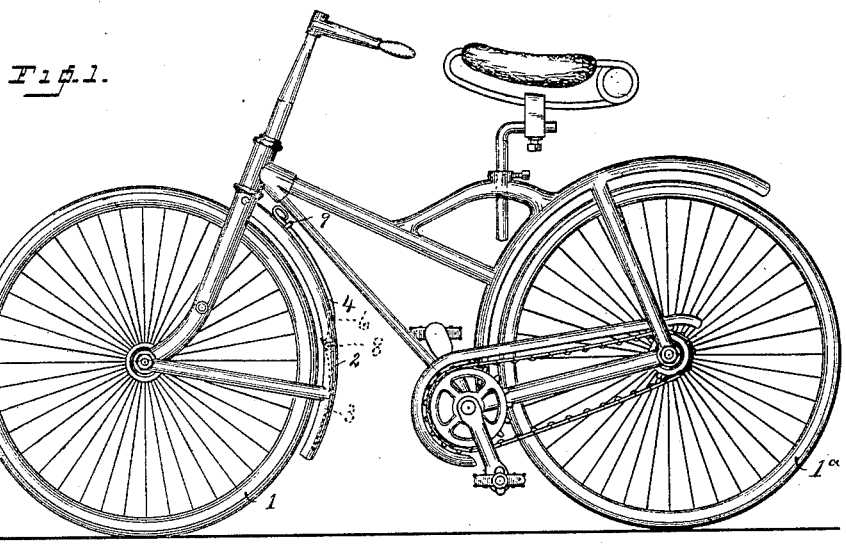
Figures 2, 3:
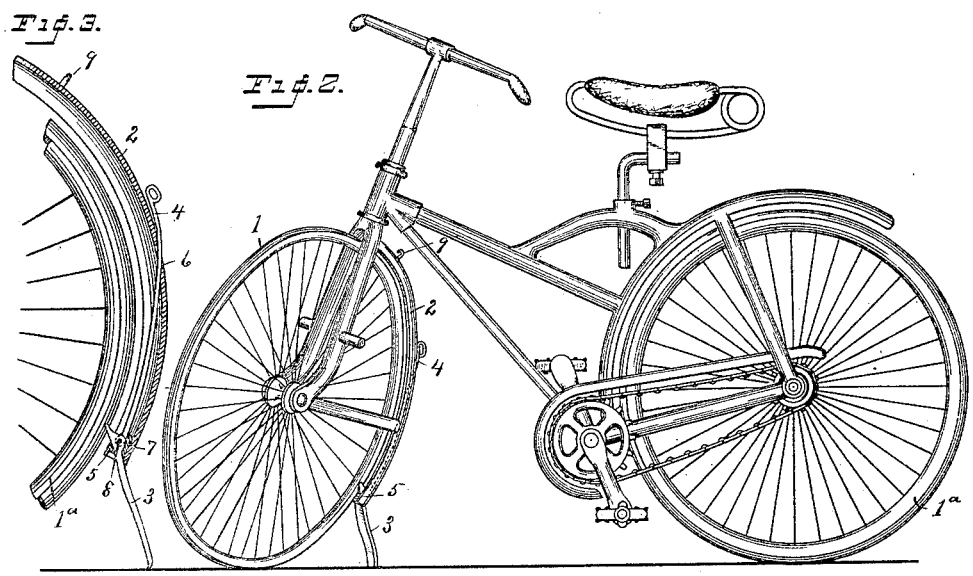
Figure 4:
Figure 5:
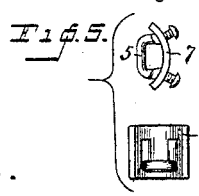

Figure 1 is a side elevation of a safety-bicycle, showing the application thereto of one form of my novel support, said support being in the retracted position, the concealed portion thereof being indicated by dotted lines; Fig. 2, an elevation of a safety-bicycle, showing the manner in which my novel device supports the machine when not in use; Fig. 3, a section, on an enlarged scale, of the mud-guard for the front wheel, my novel support being in operative position; Fig. 4, a view of the rest and operating-rod detached; Fig. 5, a view showing in plan and in elevation a guide for the rest detached; and Figs. 6, 7, 8, 9, 10, and 11 are views of a front wheel, fork, mud-guard, &c., illustrating slight changes in the details of construction of my novel support.

As my novel device is equally adapted for use upon all classes of safety-bicycles, I have deemed it wholly unnecessary to number and describe the parts of the machine, with the exception of the wheels and the mud-guard of the front wheel, to which my novel support is attached.

1 denotes the front wheel, 1ª the rear wheel, and 2 the mud-guard of the front wheel, which is rigidly secured at the back of the wheel in the usual or any preferred manner and is curved both longitudinally and transversely to correspond with the curvature of the wheel.

My novel support consists, essentially, of a rest 3, carried by the mud-guard of the front wheel and adapted to swing out backward therefrom in the operative position, the lower end of the rest engaging the ground or floor and acting, when the wheel is turned in either direction, as indicated in Fig. 2, and the bicycle inclined in the opposite direction, to support and retain it in an upright position.

In Fig. 2 the front wheel is shown as turned toward the left—that is, toward the point of view—the bicycle being at the same time in practice inclined toward the right—that is, away from the point of view. The bicycle is thus given three points of support—the rest, the front wheel, and the rear wheel—forming a tripod with two points of support in front, so that the bicycle is effectually held against tilting in either direction, and also against forward or backward movement.

Figure 9:
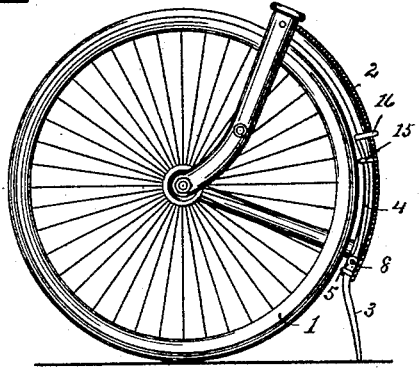

In the forms shown in Figs. 1 to 7, inclusive, and in Fig. 9 the rest is thrown from the retracted to the operative position by an operating-rod 4, which is connected to the mud-guard in such a manner as to slide freely, but without looseness or rattling. In the preferred form—that is, the one illustrated in Figs. 1 to 5, inclusive—5 denotes a guide at the lower end of the guard, upon the inner side thereof, through which the rest slides, the rest being hinged or pivoted to the lower end of the operating-rod, as clearly shown in Fig. 4. 6 denotes a slot in the back of the guard, through which the operating-rod passes. In practice the guide is preferably attached to a plate 7, which in turn is firmly screwed to the guard. The position of the rest in the retracted position is clearly shown in Fig. 1 and in the operative position in Figs. 2 and 3. The operating-rod is preferably made of heavy spring-wire, and, as shown in Figs. 1 and 4, is curved more or less, as may be required, so as to throw the rest outward when the rod is forced down. The pivotal point of the operating-rod to the rest is near the upper end of the latter, as indicated at 8, the upper end of the rest being in this form curved inwardly slightly, as indicated in Fig. 3, so as to correspond with the curvature of the tire of the wheel. The operation of this form is as follows:

Suppose the rest to be in the position shown in Fig. 1—that is, the retracted position. Should it be required to leave the wheel for a moment, the rider forces down the operating-rod from the position shown in Fig. 1 to that shown in Figs. 2 and 3. As the rod is forced downward the inward curvature of the rod acts to force the upper end of the rest inward against the guide. Consequently as the operator forces the rod and rest downward the lower end of the rest must be thrown outward, as shown in Fig. 3. The guide itself and the plate by which it is carried act as stops to limit the movement of the rest in both directions, the enlargement of the rest at the pivotal point preventing the upper end from being forced through the guide. It follows, therefore, that the rest will be forced downward and at the same time swung outward until the limit of movement is reached, the downward movement being limited by the guide and the outward movement by plate 7, or by the guard itself, if no plate is used. As already stated, the upper end of the rest is preferably curved inward, so as to partially embrace the rubber tire, although the bicycle might be supported without any engagement of the rest with the tire, as in Figs. 9 and 10. When the rider is ready to mount again, he takes hold of the upper end of the operating-rod and draws the latter and the rest upward, the upward movement of the rest acting to swing the upper end of the rest outward away from the wheel and the lower end inward, so that the rest will be drawn upward to its normal position, as shown in Fig. 1. Slot 6 in the back of the guard is made of just sufficient length to permit the operating-rod to pass freely; but at the same time the curvature of the rod causes it to engage the slot at top and bottom, thereby holding it in position and preventing rattling. When the rest is drawn upward to its highest point, the lower end thereof, which is preferably curved inward slightly, as shown, is drawn up into contact with the guide, so that it is wholly out of sight within the mud-guard, a large portion of the operating-rod lying outside of the mud-guard, as shown in Fig. 1, the curvature acting to hold it closely in contact therewith. At the upper end of the operating-rod I preferably place a ring for convenience in operation, and at a convenient place near the upper end of the mud-guard, on the outer side thereof, I place a suitable catch 9, under which the upper end of the operating-rod is passed when in the retracted position, as clearly shown in Figs. 1 and 2, thereby holding all of the parts snugly in position and preventing any rattling.

Figure 6:
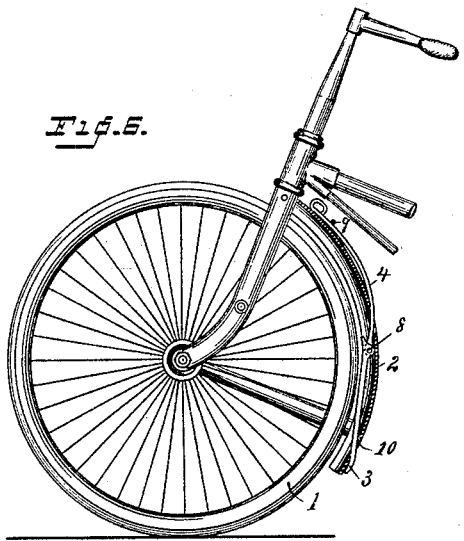
Figure 7:
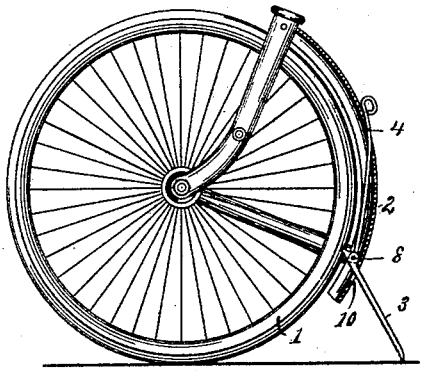

In the form shown in Figs. 6 and 7 the construction is substantially the same as in the preferred form, the only difference being that the rest is made straight instead of being slightly curved, as in the other form, and the guide 5 and plate 7 are dispensed with, the rest in this form being passed outward through a slot 10 in the guard near the lower end thereof.

Figure 8:
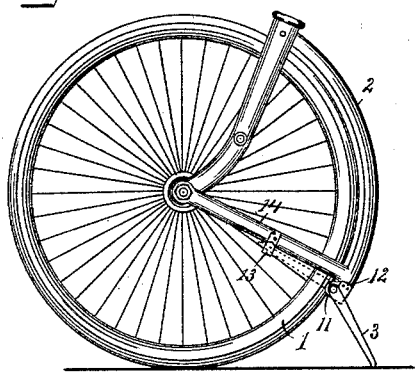

In the form shown in Fig. 8 the operating-rod is wholly dispensed with. The rest in this form is pivoted to a lug 11, which is riveted or otherwise secured to the lower end of the mud-guard upon one side thereof—the left side, as shown in the drawings. This lug is provided with a stop 12 to limit the backward movement of the rest. 13 denotes a catch upon the side brace 14. When the rest is not in use, it is merely swung upward on the left side of the wheel and side brace and engaged with catch 13, as is clearly shown in dotted lines in Fig. 8.

In the form shown in Fig. 9 both the operating-rod and the rest in the retracted position are wholly within the mud-guard, the retracted position not being shown, as it is not deemed necessary. A guide is used at the bottom of the mud-guard, as in the first form, and also an eye 15, through which the operating-rod slides. In this form the operating-rod is curved outward either to the right or left—the left, as shown in the drawings—between the mud-guard and the wheel and the outer end thereof is curved over the mud-guard to form a hand-piece 16, for convenience in moving the operating-rod up and down in setting or retracting the rest. It will be observed that in this form the contact of the upper end of the rest with the rubber tire is dispensed with, the entire strain of the rest in supporting the wheel being upon the guide at the lower end of the mud-guard.

Figure 10:
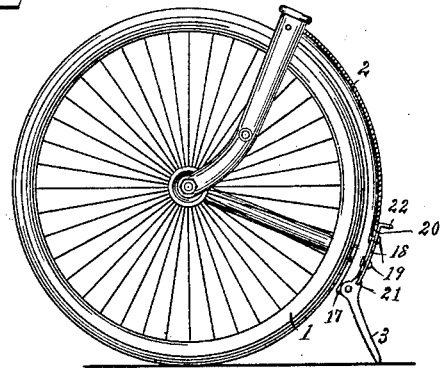
Figure 11:
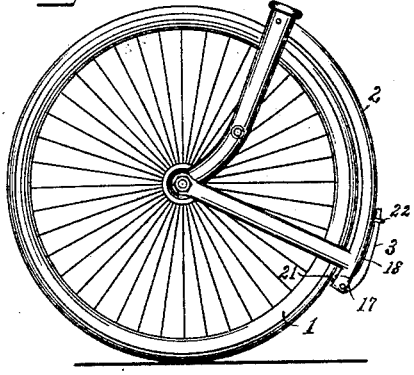

In the form shown in Figs. 10 and 11 no operating-rod is used and the rest is pivoted between the opposite sides of the mud-guard at the lower end thereof, a slot 17 being provided at the lower end of the mud-guard, through which the rest passes. 18 denotes a slide upon the outer side of the mud-guard, the rivets 19, by which it is held in place, passing through a slot 20 just above slot 17 and being headed upon the inner side thereof, so as to permit the slide to be moved up and down, but at the same time to retain it in any position in which it is placed. The lower end of this slide is adapted to engage a notch 20 in the rest to lock the latter in operative position. At the upper end of the slide is a catch 22, similar to catch 9 in the first form, with which the free end of the rest is engaged when in the retracted position. The operation in this form is as follows:

If the rider desires to leave the machine, he disengages the rest from catch 22, allows it to swing down to the operative position, and locks it there by forcing the lower end of the slide into engagement with notch 21. When he is ready to mount again, he raises the slide out of engagement with the notch and then swings the rest upward on the outside of the mud-guard and engages the free end thereof with catch 22.

Having thus described my invention, I claim—

1. The combination, with the wheels of a safety-bicycle and the mud-guard for the front wheel, of a pivoted rest carried by said mud-guard and adapted to swing backward therefrom when in operative position, so that when the wheel is turned in either direction and the bicycle inclined in the opposite direction three points of support are provided and the machine is retained in the upright position.

2. The combination, with the front wheels of a safety-bicycle and the mud-guard therefor, having a guide at its lower end, of a rest adapted to swing backward from the mud-guard when in operative position, and a curved operating-rod pivoted to the upper end of the rest and passing through a slot in the guard, so that when the operating-rod is lifted the rest is drawn upward within the guard, and when the operating-rod is forced down the rest is forced below the guard and the lower end swung outward, as and for the purpose set forth.

3. The combination, with the front wheel of a safety-bicycle and the mud-guard therefor, having a guide at its lower end, of a rest adapted to slide in said guard, the upper end of which is inwardly curved to engage the tire of the wheel, and which is pivoted near its upper end to a curved operating-rod which passes outward through the guard, as and for the purpose set forth.

In testimony whereof I affix my signature in presence of two witnesses.

GEORGE MORTSON.

Witnesses:
  A. M. WOOSTER,
  ARLEY I. MUNSON.